UNITED STATES PATENT OFFICE.

WILLIAM THOMPSON HOWARD, OF BALTIMORE, MARYLAND, ASSIGNOR TO LUCY VIRGINIA HOWARD, OF BALTIMORE, MARYLAND.

TREATMENT OF COPPER FOR VARIOUS PURPOSES.

1,257,943.      Specification of Letters Patent.     Patented Feb. 26, 1918.

No Drawing.     Application filed June 25, 1915. Serial No. 36,168.

*To all whom it may concern:*

Be it known that I, WILLIAM THOMPSON HOWARD, a subject of Great Britain, and resident of Baltimore, Maryland, have invented certain Improvements in the Treatment of Copper for Various Purposes, as will hereinafter fully appear.

This invention relates to open textured copper and processes for producing the same; and it comprises as a new composition of matter an open textured, highly porous, highly conductive material consisting of porous minute granules of metallic copper compressed into union at their meeting faces to give an electrically conductive but highly porous block or shape; and it further comprises a method of producing such a material wherein copper is reduced from one of its compounds as a minute or impalpable grained product, and such product is thereafter compressed by very heavy pressure to form an open textured aggregate with the several particles in good heat conductive, electrically conductive and mechanically cohering relation, such fine grained or impalpable copper being, and very advantageously, produced by precipitating a solution of copper sulfate or other copper salt by a fine grained metallic iron such as gray iron dust; all as more fully hereinafter set forth and as claimed.

There are very many arts in which a soft-textured, highly conductive material is needed, as in the manufacture of commutator brushes and similar contact-making devices for electrical purposes. For commutator brushes it is usual to employ carbon or graphite since they are, relatively, soft and are conductive. Graphite and other forms of carbon however are not highly satisfactory for this purpose since their conductivity is not high and they either wear or smear away or grind the contacting face of the commutator according to the greater or less softness of the material.

I have found that I can produce a new material highly satisfactory for such purposes, and also applicable to many others, by making a minutely grained or impalpable copper powder and then compressing it under heavy pressure in such a manner as to produce a block or article of more or less open texture. Because of this open texture the block or article as a whole is soft and can be readily cut and shaped by a knife. Such an article of copper on use as a commutator brush wears down to a surface giving an exact contact, and because of its high electrical conductivity imposes very little resistance in the path of the current. Contact-making devices of this material have been used in connection with commutator segments for months with very little wear, without dusting off metallic copper and with procurance of excellent contact from first to last.

While fine grained or impalpable copper powder may be made in very many ways, as by reducing copper oxid with hydrogen or other combustible gas at a temperature of 200 to 300° C., by heating the formate, by various electrical methods, etc., I find it most advantageous to make my copper powder in a rather special and particular way. To this end I use a fine grained metallic iron powder, such as is known in the pharmacopœias as ferrum reductum, for producing reduction of the copper salt. The commercial material known as "gray iron dust" is very suitable. A suitable quantity of this gray iron dust or other suitable form of reduced iron powder may be placed in a suitable vat or tub and suspended in practically pure water. These fine iron dusts do not mix well with water, owing to their air-bound pores, and it is a desirable expedient to wet or damp the iron with a little alcohol prior to contacting with the water. To this mixture of iron and water I next add a solution of a copper salt, such as a copper sulfate, or crystals of copper sulfate may be directly added. In using the crystals of copper sulfate and agitating, the crystals prior to their solution help in disintegrating the iron powder and distributing it through the water. Instead of copper sulfate another copper salt, such as copper chlorid, may be used. Reaction rapidly sets in with the formation of a very fine grained metallic copper, hydrogen being liberated and iron going into solution. Considerable heat is produced in the process.

After the reaction is complete, the solution of iron sulfate may be decanted and the fine divided copper may be washed. Washing may be with water slightly acid with sulfuric acid to remove any traces of metallic iron which may be present. Subsequent washing is done with water until the water does not alter blue litmus paper. The last washing may be done with water which is slightly alkaline with carbonate of soda or borax or other suitable alkaline material. The washed powder may be finally dried in any convenient way, drying being best so conducted as not to produce undue oxidation. It may be dried in the open air or any suitable oven at a low temperature.

The copper produced as described consists of friable porous particles; particles existing in a state of extreme subdivision. These particles are probably porous in and of themselves. Or they may be themselves aggregates of still smaller particles.

The finely divided copper or copper dust produced as just described is next placed in molds and subjected to a very high pressure. A pressure of around 60,000 pounds per square inch is suitable for making material for dynamo brushes. For other purposes the pressure may be somewhat greater or less; but it should not be great enough to reduce the material to the same specific gravity as metallic copper since for the present purposes an open textured or porous material is desired. The copper dust may be compressed in either a dry or a moist condition. Compression in a slightly moist condition is usually desirable. Any suitable type of compression machinery and molds may be used, the operation being so conducted as to give a more or less gradual reduction. Upon the degree of pressure exerted will depend the hardness or softness of the final material; and such hardness or softness can be readily adjusted to any degree which may be desired for a particular purpose.

The porous fine grained copper particles upon compression assume an interlocking position and give the desired type of aggregate while, since pressure is not carried to the point of making a material of the same specific gravity as ordinary copper, the material remains porous.

The finished article differs from cast or rolled copper not only in its relatively low specific gravity but in that it is soft and has no fiber. For these reasons it will not groove a commutator to which it is applied. Because of its character it has what may be termed self-lubricating properties. Pieces will mark paper in the same manner as a lead pencil.

In molding it may be directly converted into the shape finally desired; or it may be molded into blocks and these afterward cut or otherwise shaped into final form. The material cuts and works readily with ordinary tools.

What I claim is:—

1. As a new article, a porous, open textured material consisting of fine grained copper particles in mechanically interlocking union, such material being highly porous, soft and cutting readily with a tool, being highly conductive for heat and electricity, being less in specific gravity than cast or rolled copper, and marking paper.

2. The process of producing open textured soft material which comprises producing a fine grained mass of copper particles and compressing such mass into blocks under a pressure sufficient to give a mechanical interlocking union between the particles but insufficient to give the material the same specific gravity as compact copper.

3. The process of producing open textured soft copper material which comprises precipitating copper in a finely divided state from the solution of a copper salt with fine grained iron, washing the copper precipitate, and compressing it into open textured aggregates having the particles in interlocking mechanical union, and of a specific gravity less than that of compact copper.

WILLIAM THOMPSON HOWARD.

Witnesses:
 JULIA B. ROBINSON,
 SARAH C. SCHOTTA.